United States Patent
Wagner et al.

(10) Patent No.: US 12,380,332 B2
(45) Date of Patent: Aug. 5, 2025

(54) FORCING WEIGHTS OF TRANSFORMER MODEL LAYERS

(71) Applicant: Microsoft Technology Licensing, LLC, Redmond, WA (US)

(72) Inventors: Andy Wagner, Cupertino, CA (US); Tiyasa Mitra, San Jose, CA (US); Marc Tremblay, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 855 days.

(21) Appl. No.: 17/016,184

(22) Filed: Sep. 9, 2020

(65) Prior Publication Data

US 2022/0076127 A1 Mar. 10, 2022

(51) Int. Cl.
*G06N 3/084* (2023.01)
*G06N 3/063* (2023.01)

(52) U.S. Cl.
CPC ............. *G06N 3/084* (2013.01); *G06N 3/063* (2013.01)

(58) Field of Classification Search
CPC ........ G06N 3/084; G06N 3/063; G06N 3/044; G06N 3/045; G06N 3/082
See application file for complete search history.

(56) References Cited

U.S. PATENT DOCUMENTS

| | | | |
|---|---|---|---|
| 2020/0151570 A1 | 5/2020 | Ravi et al. | |
| 2020/0202217 A1 | 6/2020 | Son et al. | |
| 2021/0019606 A1* | 1/2021 | Yang | G06T 1/60 |
| 2021/0365791 A1* | 11/2021 | Mishali | G06N 3/084 |
| 2022/0051078 A1* | 2/2022 | Gong | G06N 3/045 |
| 2022/0366218 A1* | 11/2022 | Parisotto | G06N 3/044 |

OTHER PUBLICATIONS

Dabre, Raj, and Atsushi Fujita. "Multi-Layer Softmaxing during Training Neural Machine Translation for Flexible Decoding with Fewer Layers." arXiv preprint arXiv:1908.10118 (2019). (Year: 2019).*

Yun, Seongjun, et al. "Graph transformer networks." Advances in neural information processing systems 32 (2019). (Year: 2019).*

Xiao, Tong, et al. "Sharing attention weights for fast transformer." arXiv preprint arXiv:1906.11024 (2019). (Year: 2019).*

(Continued)

*Primary Examiner* — Miranda M Huang
*Assistant Examiner* — Sidney Vincent Bostwick
(74) *Attorney, Agent, or Firm* — Holzer Patel Drennan (57) ABSTRACT

Embodiments of the present disclosure include systems and methods for forcing weights of transformer model layers when training a transformer model. In some embodiments, input data is received at a first layer included in a transformer model. The input data is processed through the first layer of the transformer model to produce a first output data. The first output data is processed through the first layer of the transformer model to produce a second output data. The first output data is processed through a second layer included in the transformer model to produce a third output data. A difference is calculated between the second output data and the third output data. Weights included in the first layer of the transformer model are adjusted based on the calculated difference.

17 Claims, 6 Drawing Sheets

(56) References Cited

OTHER PUBLICATIONS

He, Xiaoxi, Zimu Zhou, and Lothar Thiele. "Multi-task zipping via layer-wise neuron sharing." Advances in Neural Information Processing Systems 31 (2018). (Year: 2018).*

Xiao, Xueli, et al. "Fast deep learning training through intelligently freezing layers." 2019 international conference on internet of things (iThings) and IEEE green computing and communications (GreenCom) and IEEE cyber, physical and social computing (CPSCom) and IEEE smart data (SmartData). IEEE (Year: 2019).*

Rohrer, B. (n.d.). Softmax for neural networks. Table of contents. https://e2eml.school/softmax (Year: 2020).*

Sun, Zhiqing, et al. "Mobilebert: a compact task-agnostic bert for resource-limitedd devices." arXiv preprint arXiv:2004.02984 (2020). (Year: 2020).*

Zhang, et al., "Deep learning with Elastic Averaging SGD", In Proceedings of 3rd International Conference on Learning Representations, May 7, 2015, 24 Pages.

Dabre, et al., "Multi-Layer Softmaxing during Training Neural Machine Translation for Flexible Decoding with Fewer Layers", In Repository of arXiv:1908.10118v1, Aug. 27, 2019, 7 Pages.

Ng, et al., "Magnified Gradient Function with Deterministic Weight Modification in Adaptive Learning", In Journal of IEEE Transactions on Neural Networks, vol. 15, Issue 6, Nov. 2004, pp. 1411-1423.

"International Search Report and Written Opinion Issued in PCT Application No. PCT/US2021/034662", Mailed Date: Nov. 24, 2021, 13 Pages.

Communication pursuant to Article 94(3) Received in European Patent Application No. 21734628.7, mailed on Jan. 22, 2025, 03 pages.

\* cited by examiner

FORCING WEIGHTS OF TRANSFORMER MODEL LAYERS

BACKGROUND

The present disclosure relates to a computing system. More particularly, the present disclosure relates to techniques for training a neural network.

Natural-language understanding (NLU) is a subfield of natural-language processing (NLP) in artificial intelligence that addresses comprehension by computers of the structure and meaning of human language. NLU enables voice technology, search engines, and machine translation to deduce what a user means, regardless of the way it is expressed A neural network is a machine learning model that underpins NLU applications. A neural network is trained for a particular purpose by running datasets through it, comparing results from the neural network to known results, and updating the network based on the differences.

BRIEF DESCRIPTION OF THE DRAWINGS

Various embodiments of the present disclosure are illustrated by way of example and not limitation in the figures of the accompanying drawings.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Described here are techniques for forcing weights of transformer model layers. In some embodiments, a transformer model includes a pipeline of layers. Each layer includes weights that can be trained with data. The transformer model can be configured so that the first output data of a particular layer is processed through the particular layer again to produce a second output data. The first output data is also processed through the next layer in the pipeline to produce a third output data. The difference between the second output data and the third output data is calculated and used as feedback to adjust the weights of the particular layer. This configuration and mechanism can be used for other layers in the pipeline.

The techniques described in the present application provide a number of benefits and advantages over conventional methods of implementing residual neural networks. For instance, by using the mechanism described above to update weights in a pipeline of layers of a transformer model, the weights of the layers in the pipeline are forced to become the same (e.g., the weights in each layer in the pipeline have the same or similar values). This allows the layers in a transformer model to have the same weights as well as operate in a pipelined fashion. Also, in instances where different layers of the transformer model are implemented in different processors, this mechanism reduces hardware resource utilization because forcing the weights of each layer to be the same can be achieved without passing weights between layers (e.g., reducing bandwidth usage).

Figure 1:
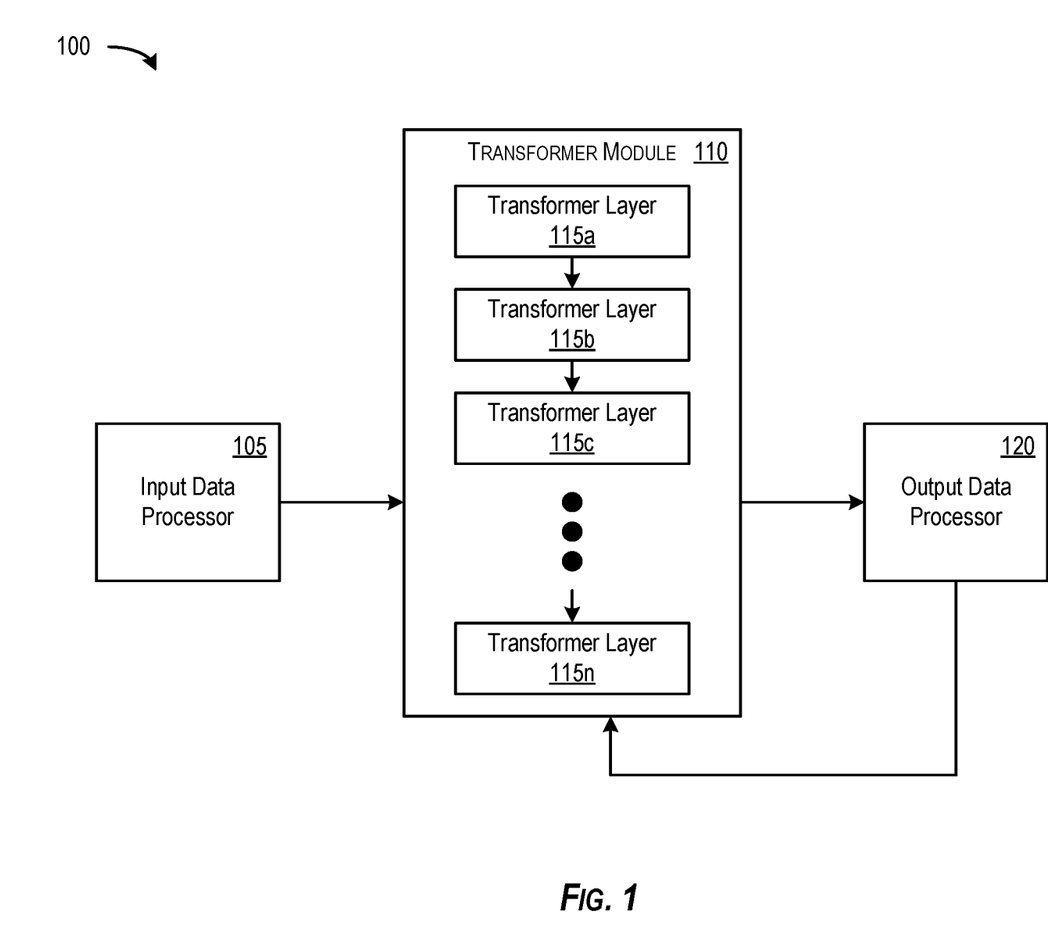
FIG. 1 illustrates a system for training a transformer model according to some embodiments.

FIG. 1 illustrates a system 100 for training a transformer model according to some embodiments. As shown, system 100 includes input data processor 105, transformer module 110, and output data processor 115. Input data processor 105 is configured to process input data used for training transformer module 110. For example, input data processor 105 may receive a set of input data that includes a sequence of tokens (e.g., a set of words) and a set of position values for the sequence of tokens. A position value may represent the relative position of a particular token in a sequence of tokens. In some cases, a set of input data can also include a set of sentence values. In some embodiments, a sentence value represents a sentence to which a token in the sequence of tokens belongs.

Based on the input data, input data processor 105 can compress tokens in the sequence of tokens. For example, input data processor 105 may identify groups of tokens in the sequence of tokens that are the same. For a particular group of same tokens, input data processor 105 can combine the position values of tokens in the group with the position value of one of the tokens in the group. Then, input data processor 105 may modify the sequence of tokens by removing the tokens in the group other than the one token from the sequence of tokens. Next, input data processor 105 can generate a set of training data that includes the modified sequence of tokens and the set of position values. Once the set of training data is generated, input data processor 105 can select a defined number of tokens in the modified sequence of tokens or a defined portion of the modified sequence of tokens (e.g., a percentage of the total number tokens in the sequence). In some embodiments, input data processor 105 selects tokens in the sequence randomly. Input data processor 105 then replaces the selected tokens with a defined token value. The selection and replacement of tokens may also referred to as token masking.

After masking tokens in the input data, input data processor 105 may determine token embeddings for each unmasked token in the sequence of tokens using an embedding space generated from a corpus of tokens (e.g., a vocabulary of words). In some embodiments, a token embedding space maps tokens in the corpus, which has many dimension, to numeric representations (e.g., vectors) having a lower number of dimensions. Then, input data processor 105 can determine position embeddings for each unmasked position value in the set of position values using an embedding space generated from a corpus of position values. The range of values in the corpus of position values can be a maximum sequence length (e.g., a maximum number of tokens in a sequence) that transformer module 110 is configured to process. For example, if transformer module 110 is configured to process sequence lengths of 1024, the range of values in the corpus of position values can be 0 to 1023. In some embodiments, a position value embedding space maps position values in the corpus, which has many dimension, to numeric representations (e.g., vectors) having a lower number of dimensions. For groups of same tokens where position values have been combined, input data processor 105 aggregates the position embeddings for these position values together to form an aggregate position embedding. In cases where the input data includes sentence values, input data processor 105 may determine sentence embeddings for each sentence value in the set of sentence values using an embedding space generated from a corpus of sentence values. In some embodiments, a sentence value embedding space maps sentence values in the corpus, which has many dimension, to numeric representations (e.g., vectors) having a lower number of dimensions. Upon determining embeddings for tokens and position values, and/or sentence values, input data processor 105 calculates an aggregate embedding for each token in the sequence of tokens by adding the token embedding, the corresponding position value embedding, and/or the corresponding sentence value embedding together. Finally, input data processor 105 sends the aggregate embeddings to transformer module 110 for training.

Transformer module 110 is responsible for predicting masked tokens given training data that includes unmasked tokens and masked tokens. In some embodiments, transformer module 110 is implemented by a transformer neural network (also referred to as a transformer or a transformer model). In some such embodiments, a transformer neural network has a sequence-to-sequence architecture. That is, the transformer neural network can transforms a given sequence of elements, such as the sequence of words in a sentence, into another sequence. In some embodiments, the transformer neural network includes weights used for predicting masked tokens and masked positions. The transformer neural network can adjust these weights based on feedback (e.g., differences between predicted tokens for masked tokens and actual values of masked tokens, etc.) received from output data processor 115 using a back propagation technique.

Transformer module 110 may determine relationships/correlations between tokens in input data. For instance, transformer module 110 can process tokens in relation to all the other tokens in a sequence, instead of one-by-one in order. In other words, transformer module 110 considers the full context of a token by looking at the tokens that come before and after it. Transformer module 110 may be used for machine translation and search (e.g., conversational queries). Other applications of transformer module 110 include: document summarization, document generation, named entity recognition (NER), speech recognition, and biological sequence analysis.

As shown in FIG. 1, transformer module 110 includes a pipeline of transformer layers 115*a-n*. Transformer layers 115*a-n* may be transformer model encoders and/or transformer model decoders. A transformer model encoder can include a self-attention block and a feed-forward neural network. When an encoder processes a given word in an input sequence, the self-attention block may enable the encoder to look at other words in input sequence. The feed-forward neural network can then process and forward the output of the self-attention block to the next encoder the pipeline. A set of attention vectors may be generated from the output of the final encoder. The set of attention vectors can be transmitted to each decoders in the transformer module 110.

Similar to an encoder, a decoder may include a self-attention block and a feed feed-forward neural network. In addition, the decoder can include an encoder-decoder attention block. The encoder-decoder attention block enables the decoder to attend to appropriate positions of an input sequence during processing. The decoder may output a matrix of floating point numbers. Transformer module 110 may convert this matrix into a natural language output sequence.

Output data processor 115 is configured to process data output from transformer module 110. For example, output data processor 115 can receive an array of data from transformer module 110 and label data. The array of data may include a numeric representation (e.g., the aggregate embedding described above) for each token in a sequence of tokens used as input to transformer module 110. The label data can include values of masked tokens in the training data. Next, output data processor 115 identifies the numeric representations of masked tokens in the array of data and determines the predicted tokens for the masked tokens. Output data processor 115 then determines the differences between the predicted tokens for masked tokens and the actual values of the masked tokens specified in the label data. Finally, output data processor 115 sends the calculated differences back to transformer module 110 to adjust the weights of transformer module 110.

Figure 2:
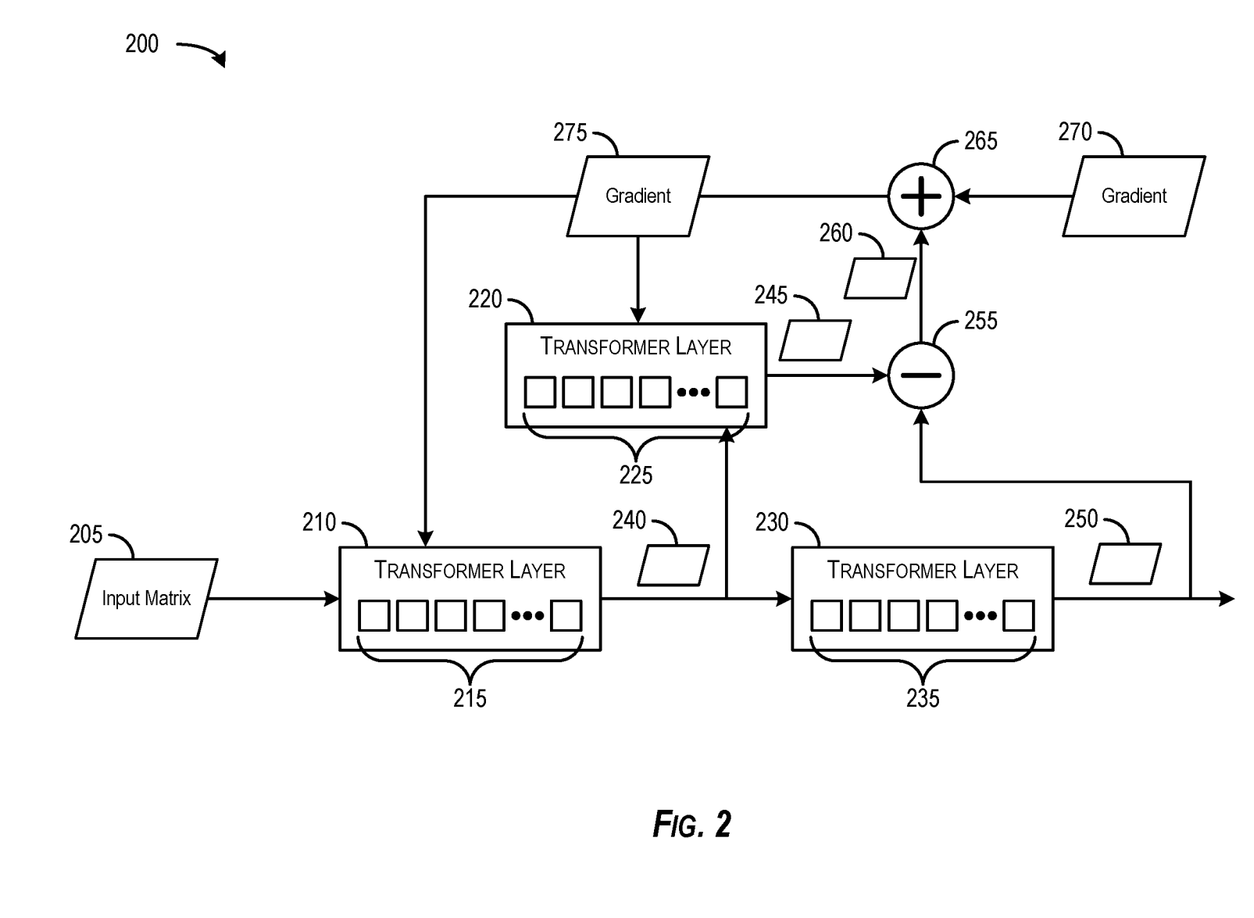
FIG. 2 illustrates an example configuration of transformer layers for forcing weights of transformer layers according to some embodiments.

FIG. 2 illustrates an example configuration 200 of transformer layers for forcing weights of transformer layers according to some embodiments. In some embodiments, configuration 200 may be used to implement any two layers in the pipeline of transformer layers 115*a-n*. As shown, configuration 200 includes transformer layers 210, 220, and 230. Transformer layers 210, 220, and 230 include weights 215, 225, and 235, respectively. In some embodiments, weights 215, 225, and 235 are initialized to the same values. That is, the values of weights 215 are the same as the values of weights 225, which are also the same as the values of weights 235.

When transformer layer 210 receives input matrix 205, transformer layer 210 processes input matrix 205 to produce output matrix 240, which is transmitted to transformer layers 220 and 230 as input. Upon receiving output matrix 240, transformer layer 220 processes it to produce output matrix 245. Similarly, once transformer layer 230 receives output matrix 240, transformer layer 230 processes it to produce output matrix 250. Difference stage 255 is configured to calculate the different between two matrices to produce a difference matrix. Here, difference stage receives output matrix 245 and output matrix 250, calculates the difference between these matrices, and sends the calculated difference 260 (i.e., the difference matrix) to aggregate stage 265.

Aggregate stage 265 is responsible for adding two matrices together to produce an aggregate matrix. In some embodiments, aggregate stage 265 operates during a feedback stage (e.g., a backpropagation stage) of the transformer model. During the feedback stage, aggregate stage 265 receives gradient 270. In some instances, gradient 270 (e.g., a gradient matrix) is generated for transformer layer 230 and used to update weights 235 of transformer layer 230. When aggregate stage 265 receives gradient 270 and difference 260, aggregate stage 265 adds them together to produce gradient 275. Gradient 275 is used during the feedback stage to update weights 215 of transformer layer 210 and weights 225 of transformer layer 220.

The operation described above can be used during training of the transformer model. Based on this configuration of transformer layers and its operation, weights 215, 225, and 235 will converge to the same or similar values in the long-term. The mechanism illustrated in FIG. 2 serves as a long-term tracking loop to keep the weights 215, 225, and 235 of transformer layers 210, 220, and 230 tied together and/or synchronized.

FIG. 2 shows transformer layer 210 and transformer layer 220 as separate layers. Since weights 215 of transformer layer 210 and weights 225 of transformer layer 220 can be initialized with the same values and are also updated using the same gradient 275, they are identical. As such, in some embodiments, transformer layers 210 and 220 may be implemented using a single layer. For instance, if transformer layer 210 is used to implement both transformer layers 210 and 220, output matrix 240 would be fed back into transformer layer 210 for processing. The result of this processing, output matrix 245, is transmitted to difference stage 255. In addition, gradient 275 would be used to update weights 215 of transformer layer 210.

Figure 3:
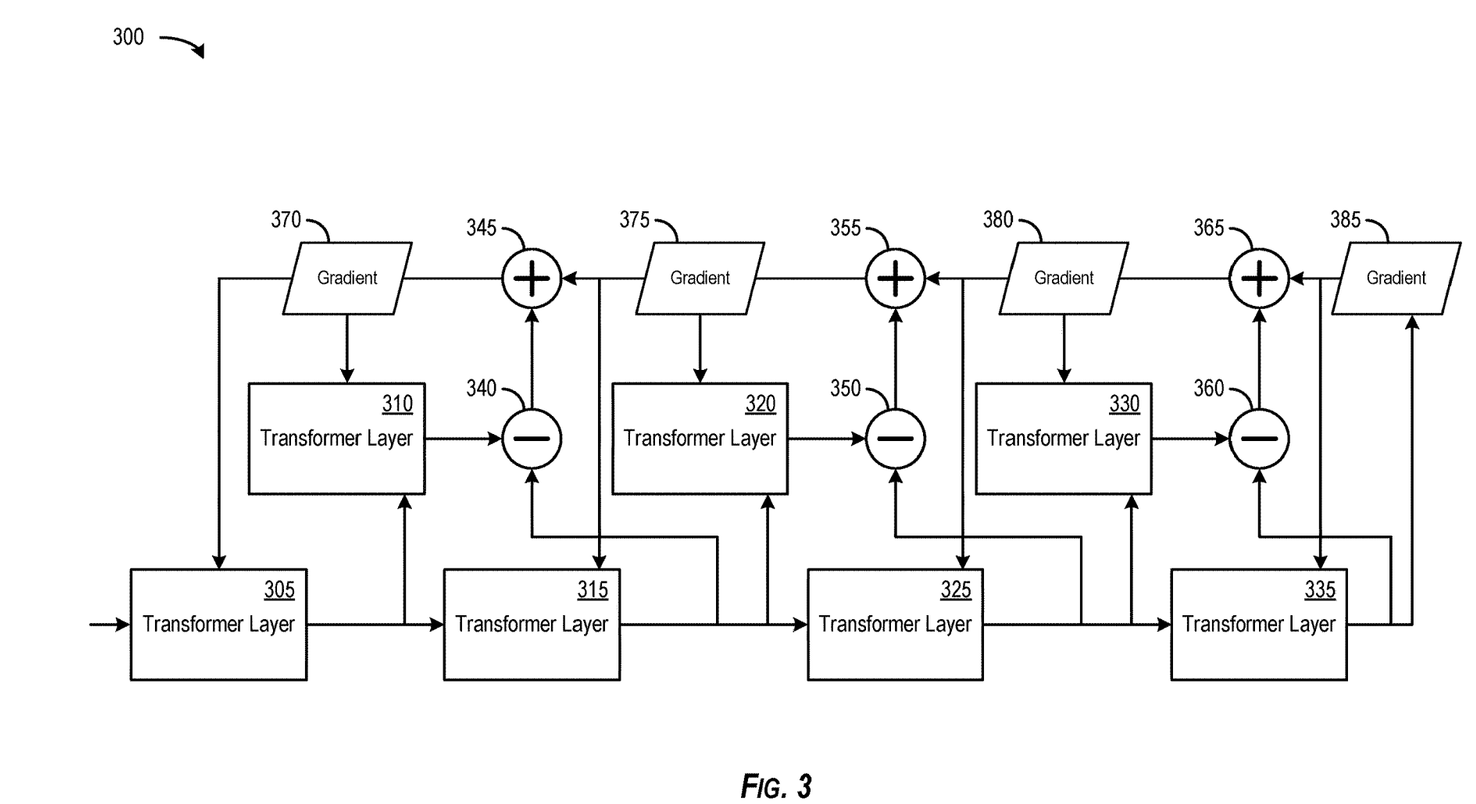
FIG. 3 illustrates another example configuration of transformer layers for forcing weights of transformer layers according to some embodiments.

FIG. 3 illustrates another example configuration 300 of transformer layers for forcing weights of transformer layers according to some embodiments. Specifically, configuration 300 shows a pipeline of four transformer layers 305-335. In some embodiments, configuration 300 may be used to implement the pipeline of transformer layers 115a-n (or a portion thereof). Transformer layers 305-335 each include weights (not shown) similar to transformer layers 210, 220, and 230. The weights can be initialized to the same values.

The same mechanism described above by reference to FIG. 2 is used for configuration 300. That is, transformer layer 305 receives input data (e.g., input matrix 205) and processes it through transformer layer 305 to produce an output matrix. Transformer layer 305 sends this output matrix to transformer layers 310 and 315. Each of the transformer layers 310 and 315 processes the output matrix to produce their own respective output matrix. The difference between the output matrices produced by transformer layers 310 and 315 is calculated by difference stage 340. During a feedback stage of the transformer model, aggregate stage 345 adds the difference calculated by difference stage 340 with gradient 375 to produce gradient 370. Gradient 370 is used to update the weights of transformer layers 305 and 310.

When transformer layer 315 receives the output matrix from transformer layer 305, transformer layer 315 processes it through transformer layer 315 to produce an output matrix. Transformer layer 315 sends its output matrix to transformer layers 320 and 325. Each of the transformer layers 320 and 325 processes the output matrix to produce their own respective output matrix. Next, difference stage 350 calculates the difference between the output matrices produced by transformer layers 320 and 325. During the feedback stage of the transformer model, aggregate stage 355 adds the difference calculated by difference stage 350 with gradient 380 to produce gradient 375, which is used to update the weights of transformer layers 315 and 320.

Upon receiving the output matrix from transformer layer 315, transformer layer 325 processes it through transformer layer 325 to produce an output matrix. Then, transformer layer 325 sends this output matrix to transformer layers 330 and 335. Each of the transformer layers 330 and 335 processes the output matrix to produce their own respective output matrix. The difference between the output matrices produced by transformer layers 330 and 335 is calculated by difference stage 360. During the feedback stage of the transformer model, aggregate stage 365 adds the difference calculated by difference stage 360 with gradient 385 to produce gradient 380. Gradient 380 is used to update the weights of transformer layers 325 and 330. Finally, when transformer layer 335 receives the output matrix from transformer layer 325, transformer layer 335 processes it through transformer layer 335 to produce an output matrix. Gradient 385 is generated based on this output matrix. The weights of transformer layer 335 are updated using gradient 385.

Similar to FIG. 2, some of the transformer layers 305-335 may be implemented using a single layer because the weights these transformer layers can be initialized with the same values and are updated using the same gradients. For instance, in configuration 300, transformer layers 305 and 310 can be implemented as a single transformer layer, transformer layers 315 and 320 can be implemented as a single transformer layer, and transformer layers 325 and 330 can be implemented as a single transformer layer.

Figure 4:
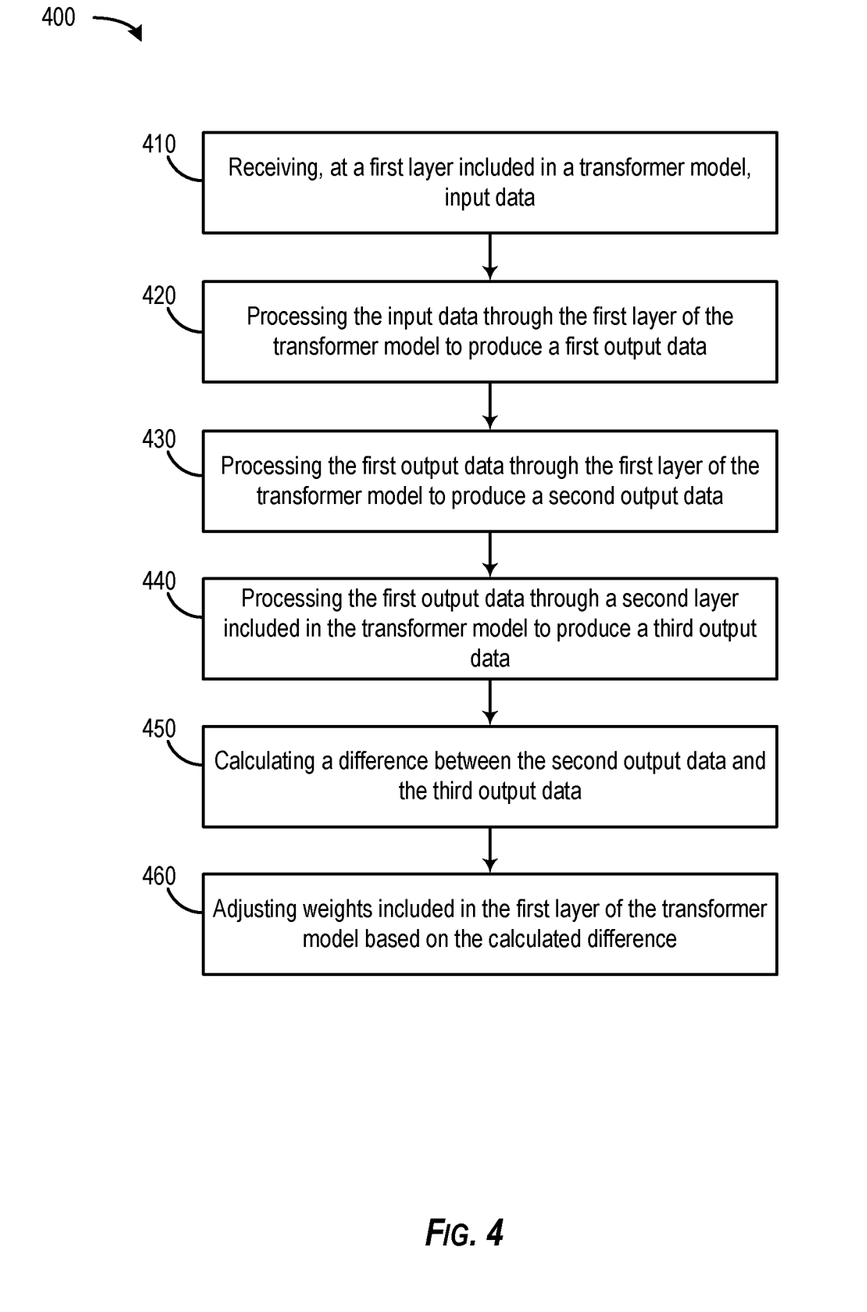
FIG. 4 illustrates a process for forcing weights of transformer model layers according to some embodiments.

FIG. 4 illustrates a process 400 for forcing weights of transformer model layers according to some embodiments. In some embodiments, transformer module 110 performs process 400. Process 400 begins at 410 by receiving, at a first layer included in a transformer model, input data. Referring to FIG. 2 as an example, transformer layer 210 can receive input matrix 205.

Next, process 400 processes, at 420, the input data through the first layer of the transformer model to produce a first output data. Referring to FIG. 2 as an example, transformer layer 210 processes input matrix 205 to produce output matrix 240. Then, process 400 processes, at 430, the first output data through the first layer of the transformer model to produce a second output data. As mentioned above, in some embodiments, transformer layers 210 and 220 may be implemented using a single layer. Thus, referring to FIG. 2 as an example, transformer 210 can process output matrix 240 to produce output matrix 245.

At 440, process 400 processes the first output data through a second layer included in the transformer model to produce a third output data. Referring to FIG. 2 as an example, transformer layer 230 processes output matrix 240 to produce output matrix 250. Next, process 400 calculates, at 450, a difference between the second output data and the third output data. Referring to FIG. 2 as an example, difference stage 255 calculates a difference between output matrix 245 and output matrix 250 to produce difference matrix 260. Finally, process 400 adjusts, at 460, weights included in the first layer of the transformer model based on the calculated difference. Referring to FIG. 2 as an example, aggregate stage 265 add difference matrix 270 to gradient 270 to produce gradient 275, which is used to update weights 215 of transformer layer 210.

Figure 5:
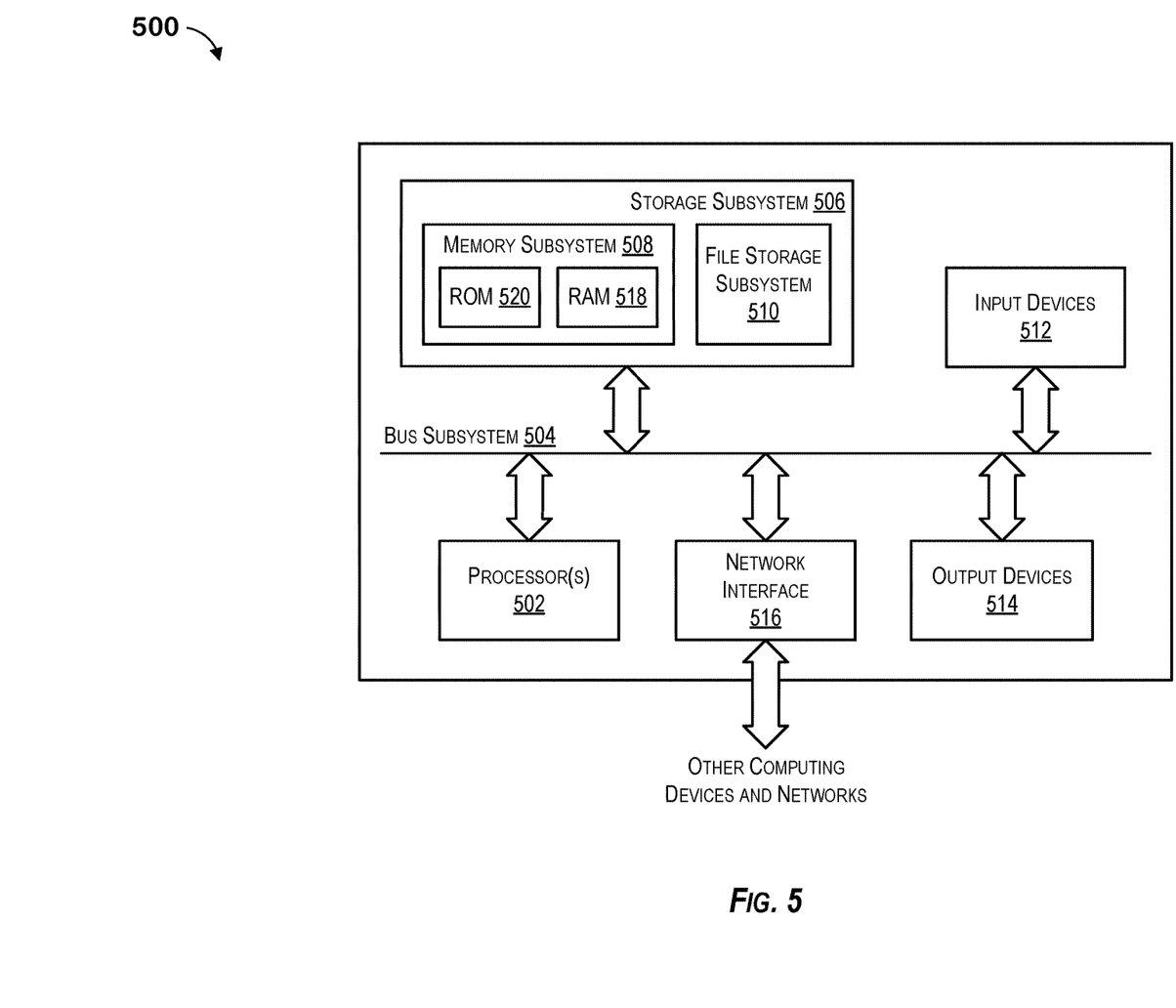
FIG. 5 depicts a simplified block diagram of an example computer system according to some embodiments.

The techniques describe above may be implemented in a wide range of computer systems configured to process neural networks. FIG. 5 depicts a simplified block diagram of an example computer system 500, which can be used to implement the techniques described in the foregoing disclosure. In some embodiments, computer system 500 may be used to implement system 100. As shown in FIG. 5, computer system 500 includes one or more processors 502 that communicate with a number of peripheral devices via a bus subsystem 504. These peripheral devices may include a storage subsystem 506 (e.g., comprising a memory subsystem 508 and a file storage subsystem 510) and a network interface subsystem 516. Some computer systems may further include user interface input devices 512 and/or user interface output devices 514.

Bus subsystem 504 can provide a mechanism for letting the various components and subsystems of computer system 500 communicate with each other as intended. Although bus subsystem 504 is shown schematically as a single bus, alternative embodiments of the bus subsystem can utilize multiple busses.

Network interface subsystem 516 can serve as an interface for communicating data between computer system 500 and other computer systems or networks. Embodiments of network interface subsystem 516 can include, e.g., Ethernet, a Wi-Fi and/or cellular adapter, a modem (telephone, satellite, cable, ISDN, etc.), digital subscriber line (DSL) units, and/or the like.

Storage subsystem 506 includes a memory subsystem 508 and a file/disk storage subsystem 510. Subsystems 508 and 510 as well as other memories described herein are examples of non-transitory computer-readable storage media that can store executable program code and/or data that provide the functionality of embodiments of the present disclosure.

Memory subsystem 508 includes a number of memories including a main random access memory (RAM) 518 for storage of instructions and data during program execution and a read-only memory (ROM) 520 in which fixed instructions are stored. File storage subsystem 510 can provide persistent (e.g., non-volatile) storage for program and data files, and can include a magnetic or solid-state hard disk drive, an optical drive along with associated removable media (e.g., CD-ROM, DVD, Blu-Ray, etc.), a removable flash memory-based drive or card, and/or other types of storage media known in the art.

It should be appreciated that computer system 500 is illustrative and many other configurations having more or fewer components than system 500 are possible.

Figure 6:
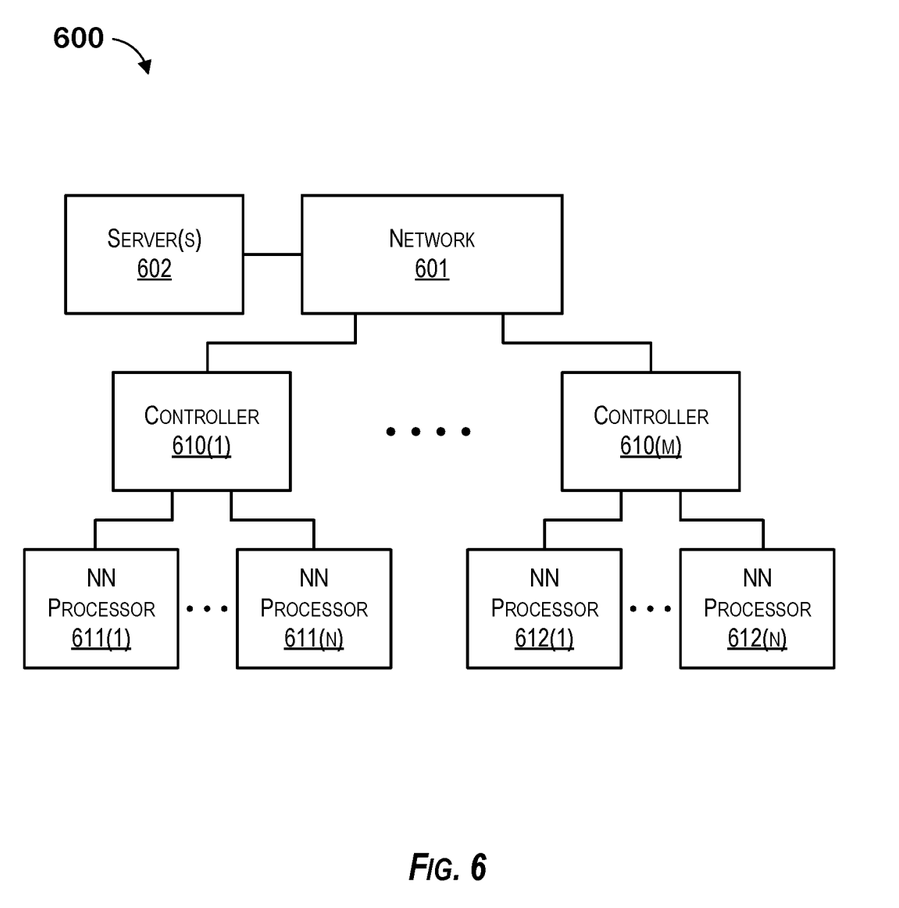
FIG. 6 illustrates a neural network processing system according to some embodiments.

FIG. 6 illustrates a neural network processing system according to some embodiments. In various embodiments, neural networks according to the present disclosure may be implemented and trained in a hardware environment comprising one or more neural network processors. A neural network processor may refer to various graphics processing units (GPU) (e.g., a GPU for processing neural networks produced by Nvidia Corp®), field programmable gate arrays (FPGA) (e.g., FPGAs for processing neural networks produced by Xilinx®), or a variety of application specific integrated circuits (ASICs) or neural network processors comprising hardware architectures optimized for neural network computations, for example. In this example environment, one or more servers 602, which may comprise architectures illustrated in FIG. 5 above, may be coupled to a plurality of controllers 610(1)-610(M) over a communication network 601 (e.g. switches, routers, etc.). Controllers 610(1)-610(M) may also comprise architectures illustrated in FIG. 5 above. Each controller 610(1)-610(M) may be coupled to one or more NN processors, such as processors 611(1)-611(N) and 612(1)-612(N), for example. NN processors 611(1)-611(N) and 612(1)-612(N) may include a variety of configurations of functional processing blocks and memory optimized for neural network processing, such as training or inference. The NN processors are optimized for neural network computations. Server 602 may configure controllers 610 with NN models as well as input data to the models, which may be loaded and executed by NN processors 611(1)-611(N) and 612(1)-612(N) in parallel, for example. Models may include layers and associated weights as described above, for example. NN processors may load the models and apply the inputs to produce output results. NN processors may also implement training algorithms described herein, for example.

FURTHER EXAMPLE EMBODIMENTS

In various embodiments, the present disclosure includes systems, methods, and apparatuses for reducing hardware resource utilization by residual neural networks. The techniques described herein may be embodied in non-transitory machine-readable medium storing a program executable by a computer system, the program comprising sets of instructions for performing the techniques described herein. In some embodiments, a system includes a set of processing units and a non-transitory machine-readable medium storing instructions that when executed by at least one processing unit in the set of processing units cause the at least one processing unit to perform the techniques described above. In some embodiments, the non-transitory machine-readable medium may be memory, for example, which may be coupled to one or more controllers or one or more artificial intelligence processors, for example.

The following techniques may be embodied alone or in different combinations and may further be embodied with other techniques described herein.

For example, in one embodiment, the present disclosure includes a system comprising a set of processing units and a non-transitory machine-readable medium storing instructions that when executed by at least one processing unit in the set of processing units cause the at least one processing unit to receive, at a first layer included in a transformer model, input data; process the input data through the first layer of the transformer model to produce a first output data; process the first output data through the first layer of the transformer model to produce a second output data; process the first output data through a second layer included in the transformer model to produce a third output data; calculate a difference between the second output data and the third output data; and adjust weights included in the first layer of the transformer model based on the calculated difference.

In one embodiment, the transformer model includes a pipeline of layers. The first layer and the second layer are included in the pipeline of layers.

In one embodiment, the present disclosure further receives, during a backpropagation operation, gradient data generated for the second layer of the transformer model, wherein adjusting the weights included in the first layer of the transformer model is further based on the gradient data.

In one embodiment, the gradient data is a first gradient data. Adjusting the weights included in the first layer of the transformer model based on the calculated difference comprises adding the calculated difference and the first gradient data to form a second gradient data and using the second gradient data to adjust the weights included in the first layer of the transformer model.

In one embodiment, the difference is a first difference. The present disclosure further processes the third output data through the second layer of the transformer model to produce a fourth output data; processes the third output data through a third layer included in the transformer model to produce a fifth output data; calculates a second difference between the fourth output data and the fifth output data; and adjusts the weights included in the second layer of the transformer model based on the calculated second difference.

In one embodiment, the present disclosure further receives, during a backpropagation operation, gradient data generated for the third layer of the transformer model, wherein adjusting the weights included in the second layer of the transformer model is further based on the gradient data.

In one embodiment, the gradient data is a first gradient data. Adjusting the weights included in the second layer of the transformer model based on the calculated second difference comprises adding the calculated second difference and the first gradient data to form a second gradient data and using the second gradient data to adjust the weights included in the second layer of the transformer model.

The above description illustrates various embodiments of the present disclosure along with examples of how aspects of the particular embodiments may be implemented.

The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A system comprising:
a set of processing units; and
a non-transitory machine-readable medium storing instructions that when executed by at least one processing unit in the set of processing units cause the at least one processing unit to:
train a transformer model over repeated iterations of training operations, the training operations facilitating a gradual convergence of weights in adjacent layers of a transformer model such that the weights in a pair of the adjacent layers approach identical values without transmitting weights between the adjacent layers, the training operations including:
receive, at a first layer included in the transformer model, input data;
process the input data through the first layer of the transformer model so that the first layer of the transformer model outputs a first output data;
process the first output data through the first layer of the transformer model so that the first layer of the transformer model outputs a second output data;
process the first output data through a second layer included in the transformer model so that the second layer of the transformer model outputs a third output data;
calculate a difference between the second output data of the first layer and the third output data of the second layer; and
adjust first weights included in the first layer of the transformer model based on a summation between gradient data and a difference term, the gradient data being received at the first layer during a backpropagation training step and the difference term quantifying a difference between the second output data generated by the first layer and the third output data generated by the second layer.

2. The system of claim 1, wherein the transformer model includes a pipeline of layers, wherein the first layer and the second layer are included in the pipeline of layers.

3. The system of claim 1, wherein the gradient data is a first gradient data, wherein adjusting the first weights included in the first layer of the transformer model based on the second output data and the third output data comprises:
adding the difference and the first gradient data to form a second gradient data; and
using the second gradient data to adjust the first weights included in the first layer of the transformer model.

4. The system of claim 1, wherein the instructions further cause the at least one processing unit to:
process the third output data through the second layer of the transformer model to produce a fourth output data;
process the third output data through a third layer included in the transformer model to produce a fifth output data;
calculate a second difference between the fourth output data and the fifth output data; and
adjust second weights included in the second layer of the transformer model based on the second difference.

5. The system of claim 4, wherein the instructions further cause the at least one processing unit to receive, during a backpropagation operation, second gradient data generated for the third layer of the transformer model, and wherein second weights included in the second layer of the transformer model are adjusted based on the second gradient data.

6. The system of claim 5, wherein adjusting the second weights included in the second layer of the transformer model based on the second difference comprises:
adding the second difference and the second gradient data to form a third gradient data; and
using the third gradient data to adjust the second weights included in the second layer of the transformer model.

7. A method comprising: training a transformer model over repeated iterations of training operations that facilitate a gradual convergence of weights in adjacent layers of the transformer model such that the weights in a pair of the adjacent layers approach identical values without transmitting weights between the adjacent layers, the training operations including: receiving, at a first layer included in the transformer model, input data;
processing the input data through the first layer of the transformer model so that the first layer of the transformer model outputs a first output data;
processing the first output data through the first layer of the transformer model so that the first layer of the transformer model outputs a second output data;
processing the first output data through a second layer included in the transformer model so that the second layer of the transformer model outputs a third output data;
calculating a difference between the second output data of the first layer and the third output data of the second layer; and
adjusting first weights included in the first layer of the transformer model based on a summation between gradient data and a difference term, the gradient data being received at the first layer during a backpropagation training step and the difference term quantifying a difference between the second output data generated by the first layer and the third output data generated by the second layer.

8. The method of claim 7, wherein the transformer model includes a pipeline of layers, wherein the first layer and the second layer are included in the pipeline of layers.

9. The method of claim 7, wherein the gradient data is a first gradient data, wherein adjusting the first weights included in the first layer of the transformer model based on the second output data and the third output data comprises:
adding the difference and the first gradient data to form a second gradient data; and
using the second gradient data to adjust the first weights included in the first layer of the transformer model.

10. The method of claim 7 further comprising:
processing the third output data through the second layer of the transformer model to produce a fourth output data;

processing the third output data through a third layer included in the transformer model to produce a fifth output data;
calculating a second difference between the fourth output data and the fifth output data; and
adjusting second weights included in the second layer of the transformer model based on the second difference.

11. The method of claim 10 further comprising receiving, during a backpropagation operation, second gradient data generated for the third layer of the transformer model, wherein adjusting the second weights included in the second layer of the transformer model is further based on the second gradient data.

12. The method of claim 11, wherein adjusting the second weights included in the second layer of the transformer model based on the second difference comprises:
adding the second difference and the second gradient data to form a third gradient data; and
using the third gradient data to adjust the second weights included in the second layer of the transformer model.

13. A non-transitory machine-readable medium storing a program executable by at least one processing unit of a computer system, the program comprising sets of instructions for:
training a transformer model over repeated iterations of training operations that facilitate a gradual convergence of weights in adjacent layers of a transformer model such that the weights in a pair of the adjacent layers approach identical values without transmitting weights between the adjacent layers, the training operations including:
receiving, at a first layer included in the transformer model, input data;
processing the input data through the first layer of the transformer model so that the first layer of the transformer model outputs a first output data;
processing the first output data through the first layer of the transformer model so that the first layer of the transformer model outputs a second output data;
processing the first output data through a second layer included in the transformer model so that the second layer of the transformer model outputs a third output data;
calculate a difference between the second output data of the first layer and the third output data of the second layer; and
adjusting first weights included in the first layer of the transformer model based on a summation between gradient data and a difference term, the gradient data being received at the first layer during a backpropagation training step and the difference term quantifying a difference between the second output data generated by the first layer and the third output data generated by the second layer.

14. The non-transitory machine-readable medium of claim 13, wherein the gradient data is a first gradient data, wherein adjusting the first weights included in the first layer of the transformer model based on the second output data and the third output data comprises:
adding the difference and the first gradient data to form a second gradient data; and
using the second gradient data to adjust the first weights included in the first layer of the transformer model.

15. The non-transitory machine-readable medium of claim 13, wherein the program further comprises sets of instructions for:
processing the third output data through the second layer of the transformer model to produce a fourth output data;
processing the third output data through a third layer included in the transformer model to produce a fifth output data;
calculating a second difference between the fourth output data and the fifth output data; and
adjusting second weights included in the second layer of the transformer model based on the second difference.

16. The non-transitory machine-readable medium of claim 15, wherein the program further comprises a set of instructions for receiving, during a backpropagation operation, second gradient data generated for the third layer of the transformer model, wherein adjusting the second weights included in the second layer of the transformer model is further based on the second gradient data.

17. The non-transitory machine-readable medium of claim 16, wherein adjusting the second weights included in the second layer of the transformer model based on the second difference comprises:
adding the second difference and the second gradient data to form a third gradient data; and
using the third gradient data to adjust the second weights included in the second layer of the transformer model.

* * * * *